United States Patent
Lee (10) Patent No.: US 8,897,110 B2
(45) Date of Patent: *Nov. 25, 2014

(54) METHOD AND APPARATUS FOR RECORDING/REPRODUCING ON/FROM A RECORDING MEDIUM

(75) Inventor: Jae Sung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 320 days.

This patent is subject to a terminal disclaimer.

(21) Appl. No.: 12/992,063

(22) PCT Filed: Apr. 30, 2009

(86) PCT No.: PCT/KR2009/002281
§ 371 (c)(1),
(2), (4) Date: Nov. 10, 2010

(87) PCT Pub. No.: WO2009/139549
PCT Pub. Date: Nov. 19, 2009

(65) Prior Publication Data
US 2011/0075539 A1    Mar. 31, 2011

(30) Foreign Application Priority Data

May 14, 2008 (KR) .................. 10-2008-0044405

(51) Int. Cl.
G11B 20/18 (2006.01)
G11B 7/0065 (2006.01)
G11B 7/007 (2006.01)
G11B 7/08 (2006.01)

(52) U.S. Cl.
CPC .......... *G11B 7/0065* (2013.01); *G11B 7/00781* (2013.01); *G11B 20/18* (2013.01); *G11B 7/083* (2013.01); *G11B 2220/2504* (2013.01)
USPC ......................... 369/53.1; 369/103

(58) Field of Classification Search
None
See application file for complete search history.

(56) References Cited

U.S. PATENT DOCUMENTS

| 6,771,273 | B2 * | 8/2004 | Miura | 345/588 |
| 7,656,564 | B2 * | 2/2010 | Yoon | 358/483 |
| 7,689,059 | B2 * | 3/2010 | Okada | 382/274 |
| 2002/0122381 | A1 * | 9/2002 | Wu et al. | 370/208 |
| 2003/0020722 | A1 * | 1/2003 | Miura | 345/560 |
| 2004/0090391 | A1 * | 5/2004 | Kondo | 345/1.1 |
| 2005/0286096 | A1 | 12/2005 | Yoon | |
| 2006/0098259 | A1 | 5/2006 | Park et al. | |
| 2008/0019251 | A1 * | 1/2008 | Choi et al. | 369/103 |

FOREIGN PATENT DOCUMENTS

| CN | 1713283 A | 12/2005 |
| JP | 2006-113182 A | 4/2006 |
| KR | 10-0277945 B1 | 10/2000 |
| KR | 10-2006-0044045 A | 5/2006 |
| KR | 10-0589585 B1 | 6/2006 |

* cited by examiner

*Primary Examiner* — Joseph Haley
*Assistant Examiner* — Parul Gupta
(74) *Attorney, Agent, or Firm* — Birch, Stewart, Kolasch & Birch, LLP (57) ABSTRACT

The present invention provides a recording medium reproducing method comprising the steps of: irradiating light onto a recording medium, the recording medium including a data image and a reference pattern, the reference pattern being divided by a plurality of fractional regions, the fractional regions being in invert, rotational and symmetrical relationship; determining information associated to data-image distortion based on the reference pattern; and correcting position of the data image based on the information relating to data-image distortion.

29 Claims, 11 Drawing Sheets

METHOD AND APPARATUS FOR RECORDING/REPRODUCING ON/FROM A RECORDING MEDIUM

This application claims the benefit of the Korean Patent Application No. 10-2008-0044405, filed on May 14, 2008, which is hereby incorporated by reference as if fully set forth herein.

BACKGROUND OF THE INVENTION

1. Field of the Invention

The present invention relates to a recording medium recording/reproducing method and a recording medium recording/reproducing apparatus and, more particularly, to a recording medium recording/reproducing method and a recording medium recording/reproducing apparatus using holography.

2. Discussion of the Related Art

With the recent development of technology, high capacity and high density recording media are being developed and introduced. Recording media may include CDs (Compact Discs) and DVDs (Digital Versatile Discs). Moreover, BDs (Blu-ray disc), the next generation recording media providing an outstandingly increased recording capacity, and recording media using holography are now being introduced. In case of the recording medium using holography, data may be overlapped and recorded in the recording medium by using the diffraction and interference of light (or light rays), thereby being capable of increasing the recording capacity to an outstanding size. Conversely, when recovering or playing-back (or reproducing) data, a method and device for accurately detecting data movement or distortion and compensating the detected data movement or distortion is more imperatively required.

SUMMARY OF THE INVENTION

Technical Objects

Accordingly, the present invention is directed to a recording medium recording/reproducing method and a recording medium recording/reproducing apparatus for compensating errors that may occur when reproducing data from a recording medium using holography.

Technical Solutions

The present invention provides a recording medium reproducing method comprising a step of irradiating light onto a recording medium, the recording medium including a data image and a reference pattern, the reference pattern being divided by a plurality of fractional regions, the fractional regions being in invert and/or rotational and/or symmetrical relationship, a step of determining information associated to data-image distortion based on the reference pattern, and a step of correcting position of the data image based on the information associated to data-image distortion.

Also, the present invention provides a recording medium playback method, wherein the information associated to data-image distortion may include an equation for estimating a fine movement of 4 neighboring reference patterns and a fine movement amount of the data image by using Quadratic Interpolation.

Also, the present invention provides a recording medium playback method, wherein the correction of the data image may use an FIR filter.

Also, the present invention provides a recording medium playback method, wherein the reference pattern may be configured of 4 fractional regions.

Also, the present invention provides a recording medium playback method, wherein, based upon any one of the 4 fractional regions, the remaining 3 fractional regions respectively may correspond to inversion and left-right symmetry, inversion and up-down symmetry, and left-right symmetry and up-down symmetry of the one fractional region.

Also, the present invention provides a recording medium playback method, wherein the reference pattern may have a same number of on's and off's.

Also, the present invention provides a recording medium recording method comprising a step of inserting a reference pattern in a data image, the reference pattern being divided by a plurality of fractional regions, the fractional regions being in invert and/or rotational and/or symmetrical relationship, a step of recording the data image in a recording medium, and wherein the reference pattern determines information associated to data-image distortion, and the position of the data image is corrected, based on the information associated to data-image distortion.

Also, the present invention provides a recording medium playback method, wherein the information associated to data-image distortion may include an equation for estimating a fine movement of 4 neighboring reference patterns and a fine movement amount of the data image by using Quadratic Interpolation.

Also, the present invention provides a recording medium playback method, wherein the correction of the data image may use an FIR filter.

Also, the present invention provides a recording medium playback method, wherein the reference pattern may be configured of 4 fractional regions.

Also, the present invention provides a recording medium playback method, wherein, based upon any one of the 4 fractional regions, the remaining 3 fractional regions respectively may correspond to inversion and left-right symmetry, inversion and up-down symmetry, and left-right symmetry and up-down symmetry of the one fractional region.

Also, the present invention provides a recording medium playback method, wherein the reference pattern may have a same number of on's and off's.

Also, the present invention provides a recording medium recording apparatus including comprising a control unit configured to insert a reference pattern in a data image, the reference pattern being divided by a plurality of fractional regions, the fractional regions being in invert and/or rotational and/or symmetrical relationship, a light-outputting unit configured to record the data image in a recording medium, and wherein the reference pattern determines information associated to data-image distortion, and the position of the data image is corrected, based on the information associated to data-image distortion.

Also, the present invention provides a recording medium recording device, wherein the information associated to data-image distortion may include an equation for estimating a fine movement of 4 neighboring reference patterns and a fine movement amount of the data image by using Quadratic Interpolation.

Also, the present invention provides a recording medium recording device, wherein the correction of the data image may use an FIR filter.

Also, the present invention provides a recording medium recording device, wherein the reference pattern may be configured of 4 fractional regions.

Also, the present invention provides a recording medium recording device, wherein, based upon any one of the 4 fractional regions, the remaining 3 fractional regions respectively may correspond to inversion and left-right symmetry, inversion and up-down symmetry, and left-right symmetry and up-down symmetry of the one fractional region.

Also, the present invention provides a recording medium recording device, wherein the reference pattern may have a same number of on's and off's.

Also, the present invention provides a recording medium reproducing apparatus including a light-outputting unit configured to irradiate light onto a recording medium, the recording medium including a data image and a reference pattern, the reference pattern being divided by a plurality of fractional regions, the fractional regions being in invert and/or rotational and/or symmetrical relationship, a control unit configured to reproduce a data image from the recording medium based on the reference pattern, and wherein the reference pattern determines information associated to data-image distortion, and the position of the data image is corrected, based on the information associated to data-image distortion.

Also, the present invention provides a recording medium recording device, wherein the information associated to data-image distortion may include an equation for estimating a fine movement of 4 neighboring reference patterns and a fine movement amount of the data image by using Quadratic Interpolation.

Also, the present invention provides a recording medium recording device, wherein the correction of the data image may use an FIR filter.

Also, the present invention provides a recording medium recording device, wherein the reference pattern may be configured of 4 fractional regions.

Also, the present invention provides a recording medium recording device, wherein, based upon any one of the 4 fractional regions, the remaining 3 fractional regions respectively may correspond to inversion and left-right symmetry, inversion and up-down symmetry, and left-right symmetry and up-down symmetry of the one fractional region.

Also, the present invention provides a recording medium recording device, wherein the reference pattern may have a same number of on's and off's.

Advantageous Effects

By using a recording medium recording/reproducing method and a recording medium recording/reproducing apparatus according to the present invention, reliability in data may be ensured when reproducing data from the recording medium.

BEST MODE FOR CARRYING OUT THE PRESENT INVENTION

The present invention provides a recording medium reproducing method comprising a step of irradiating light onto a recording medium, the recording medium including a data image and a reference pattern, the reference pattern being divided by a plurality of fractional regions, the fractional regions being in invert and/or rotational and/or symmetrical relationship, a step of determining information associated to data-image distortion based on the reference pattern, and a step of correcting position of the data image based on the information associated to data-image distortion.

Also, the present invention provides a recording medium recording method comprising a step of inserting a reference pattern in a data image, the reference pattern being divided by a plurality of fractional regions, the fractional regions being in invert and/or rotational and/or symmetrical relationship, a step of recording the data image in a recording medium, and wherein the reference pattern determines information associated to data-image distortion, the position is corrected based on the information associated to data-image distortion.

Also, the present invention provides a recording medium recording apparatus including comprising a control unit configured to insert a reference pattern in a data image, the reference pattern being divided by a plurality of fractional regions, the fractional regions being in invert and/or rotational and/or symmetrical relationship, a light-outputting unit configured to record the data image in a recording medium, and wherein the reference pattern determines information associated to data-image distortion, and the position of the data image is corrected, based on the information associated to data-image distortion.

Also, the present invention provides a recording medium reproducing apparatus including a light-outputting unit configured to irradiate light onto a recording medium, the recording medium including a data image and a reference pattern, the reference pattern being divided by a plurality of fractional regions, the fractional regions being in invert and/or rotational and/or symmetrical relationship, a control unit configured to reproduce a data image from the recording medium based on the reference pattern, and wherein the reference pattern determines information associated to data-image distortion, and the position of the data image is corrected, based on the information.

DETAILED DESCRIPTION OF THE INVENTION

Hereinafter, the recording medium recording/reproducing method and the recording medium recording/reproducing apparatus according to the present invention will now be described in detail with reference to the accompanying drawings.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Accordingly, in the description of the present invention, the term "recording medium" refers to all types of media in which data are recorded or recordable. For example, the term "recording medium" refers to all types of media regardless of the recording method, such as disc, magnetic tape, and so on. Hereinafter, for simplicity of the description of the present invention, a disc and, more particularly, a "holography recording medium" will be given as an example of the recording medium according to the present invention. However, it will be apparent that the technical scope and spirit of the present invention can also be equally applied to other types of recording media.

In the description of the present invention, the term "the recording/reproducing apparatus" is a concept including each of a recording apparatus, a reproducing apparatus or a recording and reproducing apparatus. And, the term "the recording/reproducing method" is a concept including each of a recording method, a reproducing method or a recording and reproducing method.

Figure 1:
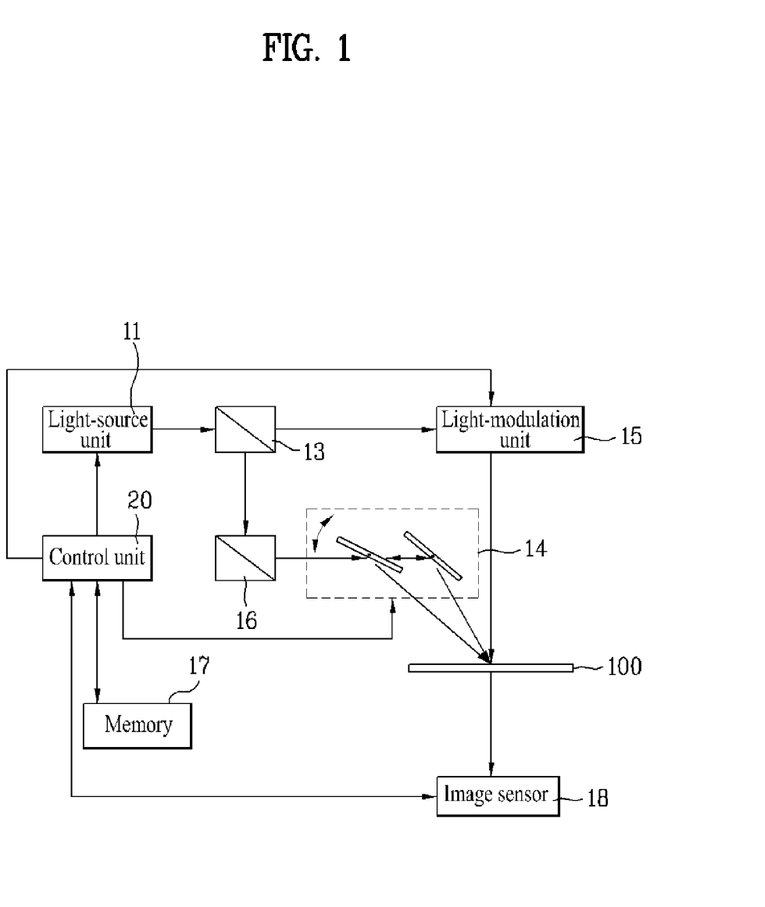
FIG. 1 illustrates a structure of a recording medium recording/reproducing apparatus according to an embodiment of the present invention.

FIG. 1 illustrates a structure of a recording medium recording/reproducing apparatus according to an embodiment of the present invention. In FIG. 1, the general elements of the recording medium recording/reproducing apparatus have been omitted. Accordingly, FIG. 1 illustrates the structure of the apparatus based upon the essential elements required for describing the technical point of the present invention. Referring to FIG. 1, the recording medium recording/reproducing apparatus according to the present invention may include a light-source unit (11), first and second light-dividing units (13 and 16), a reference light controller (14), a light-modulation unit (15), a memory (17), an image sensor (18), and a control unit (20).

The light-source unit (11) consists of a gas laser, a solid state laser, a semiconductor laser, or a semiconductor diode), which generates light having a considerably high level of interference, such as a laser beam. Also, a lens, such as a Collimator lens, preventing the light rays outputted from the light-source unit (11) from being dispersed may be placed at the output end of the light-source unit (11).

The first light-dividing unit (13) receives the light rays outputted from the light-source unit (11) and divides the received light rays into a signal light rays and a reference light rays. The first light-dividing unit (13) may consist of at least one transparent substrate and at least one lattice layer, which diffracts light, or the first light-dividing unit (13) may consist of a mirror reflecting a portion of the received light rays and enabling the remaining portion of the received light rays to pass through. A portion of the light rays passing through the first light-dividing unit (13) may be projected to the second light-dividing unit (16), and the remaining portion of the light rays passing through the first light-dividing unit (13) may be projected to the light modulator (15). Depending upon the controlling operations of the control unit (20), the light modulator (15) uses the light rays outputted from the first light-dividing unit (13) so as to generate the signal light rays, which includes data. Hereinafter, the signal light rays will be referred to as "first light rays" for simplicity. For example, the light modulator (15) may include binary data, which are expressed as black-and-white dots, in the signal light rays. Hereinafter, white dots may refer to "On", and block dots may refer to "Off" for simplicity, or vice versa. Additionally, the first light rays may include data. The data may include user data. The user data is contents which the user wishes to be record. Also, in addition to the user data, the first light rays may include control information and a mark for indicating a section of the data. Moreover, the data may also include a reference pattern. The reference pattern may perform the role of compensating other data that are recorded in the recording medium (100), when recording or reproducing of the recording medium (100). At this point, data associated to a position and format of the recorded reference pattern may be recorded in a specific device of the recording/reproducing apparatus. Moreover, the corresponding data may be recorded in a specific region, such as a control region. The data being generated from the light modulator (15) may correspond to data having 2-dimensional images. Such data will hereinafter be referred to as "data image" for simplicity. As described above, the data image may be expressed by using the on or off binary dots. Furthermore, in order to express each pixel of the data image by using the binary dots, the light modulator (15) may control the data image in pixel units or pixel block units. While the first light lays, which corresponds to the signal light lays having the above-described characteristics, is being irradiated to the recording medium (100), a second light rays is projected to the recording medium (100). The second light rays being projected from the first light-dividing unit (13) is projected to the second light-dividing unit (16), and the second light rays passing through the second light-dividing unit (16) is projected to the recording medium (100) after passing through the light controller (14). The second light rays may be referred to as reference light rays). The reference light rays may refer to light causing an interference with the first light rays, when recording data on the recording medium (100). Additionally, the reference light rays may also refer to light rays that are used to read and output data from the recording medium (100). Also, the reference light lays coming from the same light-source unit may be used. Depending upon the control operations of the control unit (20), the light controller (14) may adjust the incidence angle, direction, wave length, and phase of the second light rays, thereby projecting the second light rays to the recording medium (100). At this point, depending upon the phase and wave length of the reference light rays, different interference fringes may be recorded in the recording medium (100). Therefore, by varying the phase and wave length of the reference light rays, data may be repeatedly recorded in the same region of the recording medium (100) in an overlapping format. By using the above-described characteristics, the capacity of the holography recording medium may be increased. Also, a plurality of data may be recorded in one region. Also, as an element including the characteristics of both of the above-described light-source unit (11) and first light-dividing unit (13), a "first light output unit" may be used in the present invention. Additionally, as an element including the above-described light-source unit (11), second light-dividing unit (16), and light controller (14), a "second light output unit" may be used in the present invention. Furthermore, when recording of the recording medium (100), both the first light-dividing unit (13) and the second light-dividing unit (16) shall be used. Conversely, when reproducing of the recording medium (100), an image recorded in the recording medium (100) may be read and outputted by using only the reference light rays. Therefore, when reproducing the recording medium, only the second light-dividing unit (16) may be used. When reproducing, light rays having the same phase and wave length as the light rays used for recording may be irradiated to the recording medium, so as to read and output information. Accordingly, the phase and wave length of the light and incidence angle, which are used during the recording process, may be recorded or stored in the memory (17). Furthermore, the recorded data may be recorded in the recording medium (100) in the form of data images. Herein, when such data images are recorded in the same region of the recording medium (100) in an overlapped format, each of the recorded data image may be referred to as a "data page". The memory (17) may store the data that are to be recorded in the recording medium (100), and, among the data that are being recorded in the recording medium (100), information other than the user data may also be stored in the memory (17). For example, the shapes of the reference pattern may be stored in the memory (17). The image sensor (18) may consist of a light detecting device, such as a CCD (charge-coupled device) or a CMOS. Moreover, the image sensor (18) may consist of a plurality of light detecting devices. For example, the image sensor (18) may consist of a plurality of light detecting devices that can provide a resolution of 300*200 or 1000*800. The image sensor (18) may receive light rays passing through the recording medium (100) or being reflected from the recording medium (100), and the image sensor (18) may read and output data images included in the received light rays. For example, the image sensor (18) of FIG. 1 may receive light rays passing through the recording medium (100). Alternatively, the image sensor (18) may also receive phase conjugate signal light rays (corresponding to the data image), which are generated in a direction reflecting from the recording medium (100). Meanwhile, the image sensor (18) may also be referred to as a light receiver.

The control unit (20) may read data being recorded in the memory (17) or the recording medium (100), or the control unit (20) may generate new data, thereby providing the read or generated data to the light-modulation unit (15). Also, the control unit (20) controls the light-modulation unit (15) to generate a 2-dimensional bitmap, wherein data that are read from the memory (17) are expressed as black-and-white dots. Moreover, the control unit (20) controls the light controller (14 to adjust the intensity, incidence angle, phase, and wave length of the second light rays, which cause interference with the first light rays. Moreover, as described above, the control unit (20) controls the light controller (14) to store a plurality of data images (data pages) in the same region of the recording medium (100). Additionally, the control unit (20) controls the light controller (14) to project a light beam having the same conditions as that used during the recording process, thereby reproducing the data stored in the recording medium. Also, the control unit (20) may detect light intensity of each of the 2-dimensional directions, i.e., x-direction (horizontal) and y-direction (vertical) of the sample data read and outputted by the image sensor (18). Moreover, the control unit (20) may insert a reference pattern in the data being projected to the light-modulation unit (15). This reference pattern may be generated and inserted in accordance with a predetermined rule. This predetermined rule will be described in detail later on with reference to FIG. 2 to FIG. 4. Additionally, the control unit (20) may store information associated with the shape of the reference pattern and the insertion position of the reference pattern in the memory (17). Furthermore, the control unit (20) may read and output the recorded reference pattern, thereby using the read and outputted reference pattern to compensate data other than the reference pattern. More specifically, the control unit (20) may use the reference pattern to correct the data images. The control unit may read and output the reference pattern data from the recording medium (100), so as to compare the read and outputted data with the data stored in the memory (17), thereby correcting the data image. At this point, the shape and position of the reference pattern may become the target of comparison.

FIG. 2 to FIG. 5 respectively illustrate a reference pattern (200) according to an embodiment of the present invention. More specifically, FIG. 2 to FIG. 5 respectively illustrate the reference pattern according to the embodiments of the present invention in the perspective of a rule for generating the reference pattern, and not in pixel units. The reference pattern according to the embodiment of the present invention may be configured of fractional regions, and each fractional region may include a consistent rule. Herein, the reference pattern is configured of fractional regions each having the same consistent rule in order to facilitate the symmetry, repetition, and correction. Furthermore, the size of the reference pattern may be defines as pixels, and this may be decided based upon the size of the data image and the accuracy of the correction.

Referring to FIG. 2 to FIG. 5, the illustrated reference pattern may be configured of 4 fractional regions. When creating one of the 4 fractional regions (210, 220, 230, 240) shown in FIG. 2, the created fractional region is used to create the remaining 3 fractional regions. This may be applied to other fractional regions other than a 4-fractional-region configuration. Also, the reference pattern may be generated so as to have the same number of on's and off's. This is required for the stabilization of a center frequency when reproducing the data. When one fractional region is decided in the reference pattern (200) configured of 4 fractional regions, the remaining 3 fractional regions may be generated through inversion, rotation, and symmetry by using the created fractional region. Herein, inversion corresponds to changing the contrast. For example, on may be changed to off, and off may be changed to on. Rotation corresponds to rotating the generated fractional region by a constant degree. For example, the fractional region may be rotated by 90°, 180°, and 270°. And, symmetry corresponds to left-right (horizontal) symmetry or up-down (vertical) symmetry. Herein, inversion, rotation, and symmetry may each be applied differently, or may be applied in combination of two or more of inversion, rotation, and symmetry. More specifically, when a fractional region is created, the remaining 3 fractional regions may be created through inversion, rotation, or symmetry, or through a combination of inversion, rotation, and/or symmetry. Furthermore, for example, in order to allow the reference pattern to have the same number of on's and off's, inversion may be used twice.

Figure 2:
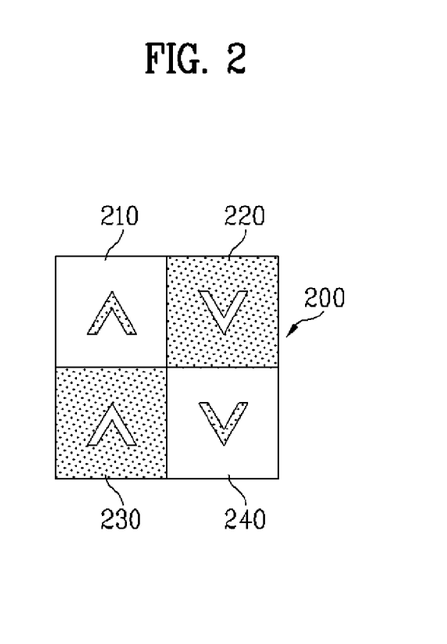
FIG. 2 illustrates a reference pattern according to an embodiment of the present invention.

FIG. 2 illustrates a reference pattern configured of 4 fractional regions according to an embodiment of the present invention. Among the 4 fractional regions, description will be made based upon the upper left side fractional region (210) for simplicity. According to the above-described rule, the upper left side fractional region (210) and the upper right side fractional region (220) are created by using inversion and symmetry. More specifically, the on and off are switched, and the up-down (vertical) symmetry is used. And, the lower left side fractional region (230) is created by inverting the upper left side fractional region (210). Furthermore, the lower right side fractional region (240) is configured as a symmetrical form of the upper left side fractional region (210).

Figure 3:
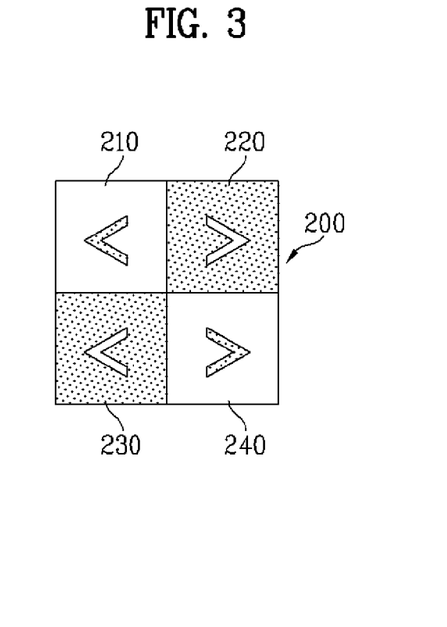
FIG. 3 illustrates a reference pattern according to another embodiment of the present invention.

FIG. 3 illustrates a reference pattern configured of 4 fractional regions according to another embodiment of the present invention. Referring to FIG. 3, the upper right side fractional region (220) is configured by using inversion and left-right (horizontal) symmetry of the upper left fractional region (210). Also, the lower left side fractional region (230) is configured by using inversion of the upper left fractional region (210). Furthermore, the lower right side fractional region (240) is configured by using left-right (horizontal) symmetry of the upper left fractional region (210).

Figure 4:
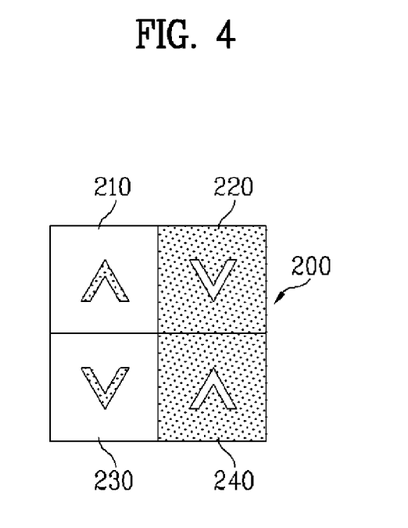
FIG. 4 illustrates a reference pattern according to yet another embodiment of the present invention.

FIG. 4 illustrates a reference pattern configured of 4 fractional regions according to yet another embodiment of the present invention. Referring to FIG. 4, the upper right side fractional region (220) is configured by using inversion and up-down (vertical) symmetry of the upper left fractional region (210). Also, the lower left side fractional region (230) is configured in a symmetrical form of the upper left fractional region (210). Furthermore, the lower right side fractional region (240) is configured by using inversion of the upper left fractional region (210).

Figure 5:
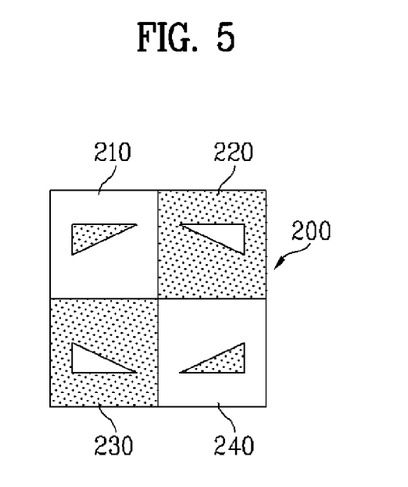
FIG. 5 illustrates a reference pattern according to yet another embodiment of the present invention.

FIG. 5 illustrates a reference pattern configured of 4 fractional regions according to yet another embodiment of the present invention. Referring to FIG. 5, the upper right side fractional region (220) is configured by using inversion and left-right (horizontal) symmetry of the upper left fractional region (210). Also, the lower left side fractional region (230) is configured by using up-down (vertical) symmetry and inversion of the upper left fractional region (210). Furthermore, the lower right side fractional region (240) is configured by using left-right (horizontal) symmetry and up-down (vertical) symmetry of the upper left fractional region (210).

Herein, it will be apparent that the reference pattern according to the present invention can be created (or generated) by using a variety of methods other than the method according to the embodiment of the present invention.

Figure 6:
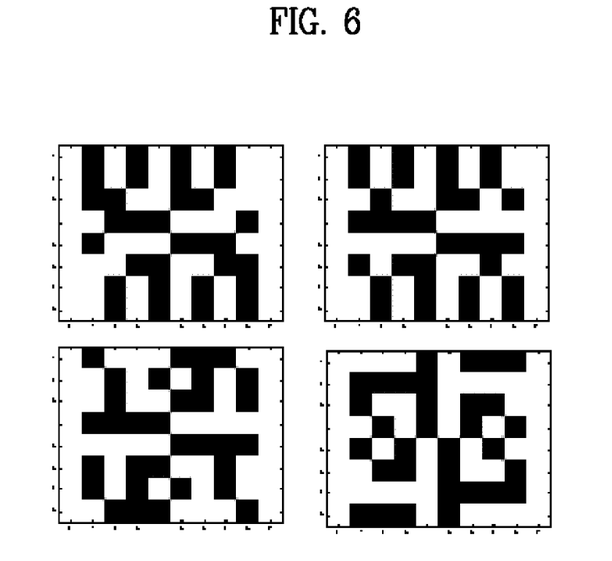
FIG. 6 illustrates a reference pattern created in pixel units by using a method for generating a reference pattern according to an embodiment of the present invention.

FIG. 6 illustrates a reference pattern created in pixel units by using a method for generating a reference pattern according to an embodiment of the present invention. More specifically, the reference pattern of FIG. 6 is created in accordance with the rule shown in FIG. 5. More specifically, the number of on's is equal to the number of off's, and, among the 4 fractional regions, the remaining 3 fractional regions are created by using inversion, left-right (horizontal) symmetry, and up-down (vertical) symmetry of the upper left fractional region.

Figure 7:
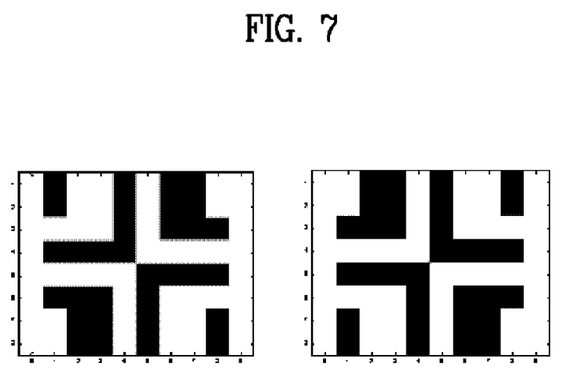
FIG. 7 illustrates a reference pattern created in pixel units by using a method for generating a reference pattern according to another embodiment of the present invention.
Figure 9:
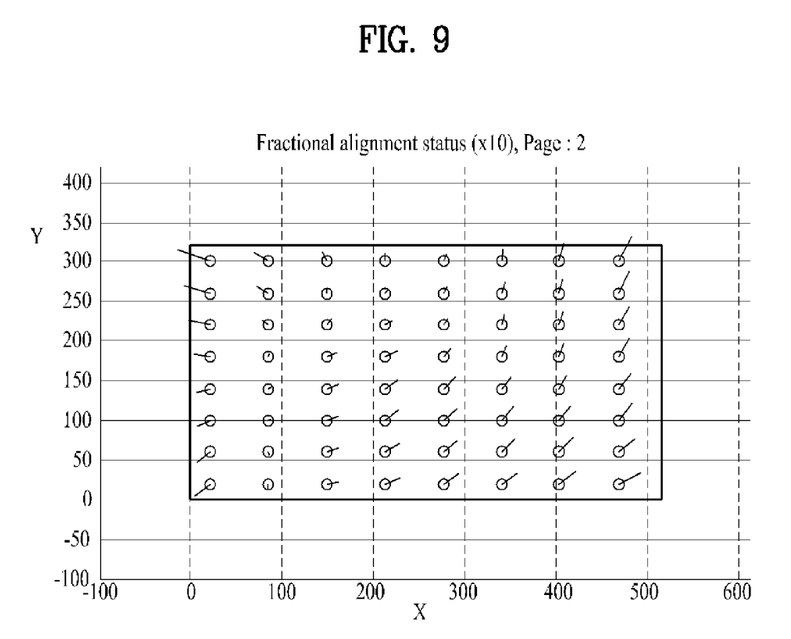
FIG. 9 illustrates fine movement amount of a reference pattern position according to an embodiment of the present invention.

FIG. 7 illustrates a reference pattern created in pixel units by using a method for generating a reference pattern according to an embodiment of the present invention. The reference pattern shown in FIG. 7 is created in accordance with the rule shown in FIG. 5. However, in the present invention, the reference pattern of FIG. 7 seeks to protect (or preserve) the rule as well as the structure. Herein, the inversion and rotation of the reference pattern itself also correspond to the same reference pattern, and a reference pattern created by using the inversion and rotation according to a rule other than the one used in the upper left side fractional region of FIG. 7 may also correspond to the same reference pattern. The distance between each reference pattern may be controlled in pixel units or in pixel block units. The position of the reference pattern for each of the recorded data image may be compared with the position of the reference pattern that is reproduced. Most particularly, by comparing the recorded reference pattern with the reproduced reference pattern, the distance and direction of movement may be obtained and indicated, which is as shown in FIG. 9. Herein, a map showing the distance and direction of movement prior to and after the recording of the reference pattern is referred to as a "shift map". The "shift map" may indicate a distortion characteristic of the recording/reproducing apparatus. In the description of the present invention, the minimum unit of a 2-dimensional data image including one reference pattern is referred to as a tile. However, the present invention will not be limited by the term tile.

Figure 8:
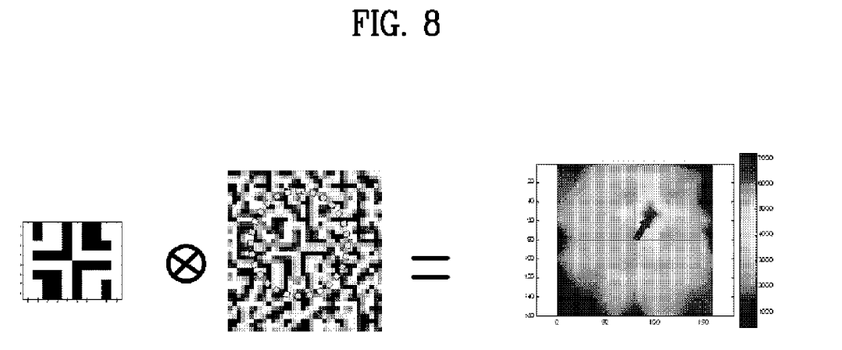
FIG. 8 illustrates a X-correlation result between the reference pattern and a data image including the reference pattern according to an embodiment of the present invention.

FIG. 8 illustrates an X-correlation result between the reference pattern and a data image including the reference pattern according to an embodiment of the present invention. When the X-correlation has a similar shape as the reference pattern, the X-correlation may indicate the greatest value. Therefore, the movement of the reference pattern may be estimated by using the maximum movement amount of the X-correlation.

Figure 10:
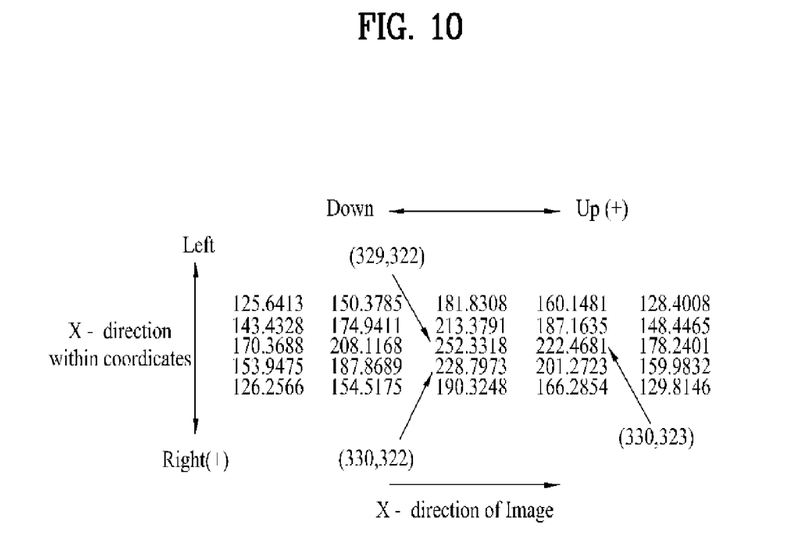
FIG. 10 illustrates the data respective to the X-correlation result of FIG. 8.

FIG. 10 illustrates the data respective to the X-correlation result of FIG. 8. Among the data values shown in FIG. 10, a point of the coordinates (329,322), which corresponds to the maximum value 252.3318, corresponds to the moved position of the reference pattern. However, as a value estimated by pixel units, the coordinates (329,322) corresponding to the maximum value 252.3318, requires a fine movement amount in below-pixel units to be additionally applied.

Figure 11:
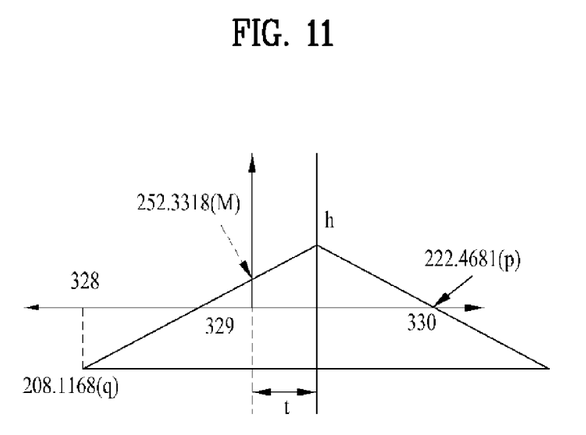
FIG. 11 illustrates a method for measuring below-pixel unit fine movement amount using the pixel unit X-correlation result of FIG. 8.

FIG. 11 illustrates a method for measuring a fine movement amount in below-pixel unit. By comparing the left side and right side data values of the value 252.3318, which corresponds to the maximum value shown in FIG. 10, a direction of concentrated data distribution may be measured. Bases upon the result of the right side data value being greater than the left side data value, it may be determined that the data value is concentrated more to the right side. Assuming that the distance in pixel units is equal to 1, the angle of inclination may be measured. At this point, the inclination s becomes (M−q)/1, and the respective value is (252.3318−208.1168)/1=44.215. When considering a fine movement amount in the below-pixel unit, the maximum value becomes point h, and the respective inclination becomes (h−208.1168)/(1+t), and t becomes the below-pixel unit fine movement amount. (h−208.1168)/(1+t)=44.215, and, when the inclination in the opposite direction is calculated by using the equation (h−222.4618)/(1−t)=44.215, the value of t=0.16229 may be known. Accordingly, by using a summed value of the pixel-unit fine movement amount and a fine movement amount in the below-pixel unit, the fine movement amount of the reference pattern may be estimated. In the present invention, the fine movement amount has been estimated by using the above-described method. However, this is merely exemplary and, therefore, the present invention will not be limited only to the above-described method. And, accordingly, anyone skilled in the art will be capable of estimating the fine movement amount by using other methods.

Figure 12:
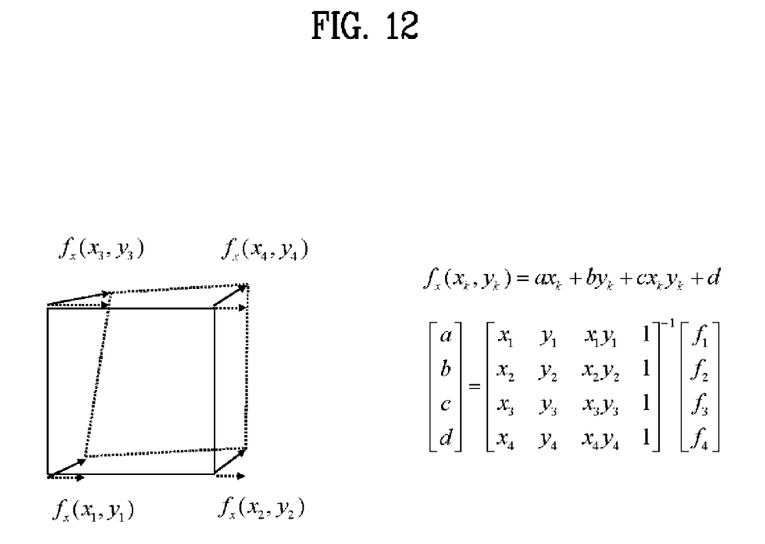
FIG. 12 illustrates a formula for estimating a fine movement amount of data mages using the fine movement amount of the reference pattern.

FIG. 12 illustrates a method for estimating the fine movement amount of all data images based upon the fine movement amounts in 4 different reference patterns. At this point, an equation for measuring a fine movement amount between specific positions may be estimated by using a Quadratic Interpolation method. However, anyone skilled in the art will be capable of estimating equations for measuring fine movement amounts by using a variety of other methods.

In the 4 points of reference pattern, $f_1$, $f_2$, $f_3$, $f_4$ respectively indicate the movement amount in the x-direction. And, x1 and y1 respectively indicate the coordinate values of each reference pattern. By using each position of the 4 points, the coefficient values for the equation may be calculated, and, the data images, e.g., the fine movement amount of each pixel may be estimated by using the calculated coefficient value.

Figure 13:
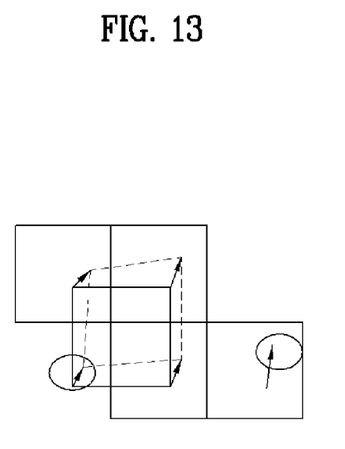
FIG. 13 illustrates a method of estimating other remaining positions of the reference pattern based upon adjacent reference pattern positions by using 3 specific positions of the reference pattern according to an embodiment of the present invention.

FIG. 13 illustrates a method of estimating other remaining positions of the reference pattern based upon adjacent reference pattern positions by using 3 specific positions of the reference pattern according to an embodiment of the present invention. By using the above-described equations, the pixel-unit fine movement amount (x and y directions) may be compensated, and a FIR filter may be applied for oversampling. According to the present invention, by inserting a reference pattern in a data image, e.g., a tile, and by measuring the distance and direction of movement of the reference pattern, so as to form a corresponding equation, the distance and direction of movement of the pixels may be generalized, thereby enabling a degree of distortion within the data to be efficiently measured and compensated.

Based upon the above-described description of the present invention, it will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

By using the recording medium the recording playback method and the recording playback device according to the present invention, reliability in data may be ensured when playing-back the recording medium. It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A recording medium reproducing method, comprising the steps of:
   irradiating light onto a recording medium, the recording medium including a data image and a reference pattern image, the reference pattern image being within user data of the data image, the reference pattern image being divided by a plurality of fractional regions, the fractional regions being in an invert and/or rotational and/or symmetrical relationship;
   determining information associated to data-image distortion based on the reference pattern image; and
   correcting a position of the data image based on the information associated to data-image distortion.

2. The method of claim 1, wherein the information associated to data-image distortion includes an equation for estimating a fine movement of 4 neighboring reference pattern images and a fine movement amount of the data image by using Quadratic Interpolation.

3. The method of claim 1, wherein the correction of the data image uses an FIR filter.

4. The method of claim 1, wherein the reference pattern image is configured of 4 fractional regions.

5. The method of claim 4, wherein, based upon any one of the 4 fractional regions, the remaining 3 fractional regions respectively correspond to inversion and left-right symmetry, inversion and up-down symmetry, and left-right symmetry and up-down symmetry of the one fractional region.

6. The method of claim 1, wherein the reference pattern image has a same number of ONs and OFFs.

7. A recording medium recording method, comprising the steps of:
   inserting a reference pattern image in user data of a data image, the reference pattern image being divided by a plurality of fractional regions, the fractional regions being in an invert and/or rotational and/or symmetrical relationship; and
   recording the data image in a recording medium,
   wherein the reference pattern image determines information associated to data-image distortion, and a position of the data image is corrected, based on the information associated to data-image distortion.

8. The method of claim 7, wherein the information associated to data-image distortion includes an equation for estimating a fine movement of 4 neighboring reference pattern images and a fine movement amount of the data image by using Quadratic Interpolation.

9. The method of claim 7, wherein the correction of the data image uses an FIR filter.

10. The method of claim 7, wherein the reference pattern image is configured of 4 fractional regions.

11. The method of claim 10, wherein, based upon any one of the 4 fractional regions, the remaining 3 fractional regions respectively correspond to inversion and left-right symmetry, inversion and up-down symmetry, and left-right symmetry and up-down symmetry of the one fractional region.

12. The method of claim 7, wherein the reference pattern image has a same number of ONs and OFFs.

13. A recording medium recording apparatus, comprising:
   a control unit configured to insert a reference pattern image in user data of a data image, the reference pattern image being divided by a plurality of fractional regions, the fractional regions being in an invert and/or rotational and/or symmetrical relationship; and
   a light-outputting unit configured to record the data image in a recording medium,
   wherein the reference pattern image determines information associated to data-image distortion, and a position of the data image is corrected based on the information associated to data-image distortion.

14. The recording medium recording apparatus of claim 13, wherein the information associated to data-image distortion includes an equation for estimating a fine movement of 4 neighboring reference pattern images and a fine movement amount of the data image by using Quadratic Interpolation.

15. The recording medium recording apparatus of claim 13, wherein the correction of the data image uses an FIR filter.

16. The recording medium recording apparatus of claim 13, wherein the reference pattern image is configured of 4 fractional regions.

17. The recording medium recording apparatus of claim 16, wherein, based upon any one of the 4 fractional regions, the remaining 3 fractional regions respectively correspond to inversion and left-right symmetry, inversion and up-down symmetry, and left-right symmetry and up-down symmetry of the one fractional region.

18. The recording medium recording apparatus of claim 13, wherein the reference pattern image has a same number of ONs and OFFs.

19. A recording medium reproducing apparatus, comprising:
   a light-outputting unit configured to irradiate light onto a recording medium, the recording medium including a data image and a reference pattern image, the reference pattern image being within user data of the data image, the reference pattern image being divided by a plurality of fractional regions, the fractional regions being in an invert and/or rotational and/or symmetrical relationship; and a control unit configured to
reproduce a data image from the recording medium based on the reference pattern image,
determine information associated to data-image distortion based on the reference pattern image, and
correct a position of the data image based on the information associated to data-image distortion.

20. The recording medium reproducing apparatus of claim 19, wherein the information associated to data-image distortion includes an equation for estimating a fine movement of 4 neighboring reference pattern images and a fine movement amount of the data image by using Quadratic Interpolation.

21. The recording medium reproducing apparatus of claim 19, wherein the correction of the data image uses an FIR filter.

22. The recording medium reproducing apparatus of claim 19, wherein the reference pattern image is configured of 4 fractional regions.

23. The recording medium reproducing apparatus of claim 22, wherein, based upon any one of the 4 fractional regions, the remaining 3 fractional regions respectively correspond to inversion and left-right symmetry, inversion and up-down symmetry, and left-right symmetry and up-down symmetry of the one fractional region.

24. The recording medium reproducing apparatus of claim 19, wherein the reference pattern image has a same number of ONs and OFFs.

25. The recording medium reproducing apparatus of claim 19, wherein the control unit is further configured to compensate the data image except the reference pattern image based on the reference pattern image.

26. The recording medium reproducing apparatus of claim 19, wherein the information associated to data-image distortion indicates shape and position of the reference pattern image.

27. The method of claim 1, wherein the information associated to data-image distortion is determined by comparing pre-recorded position information on the reference pattern image with a position of the reference pattern image read from the recording medium.

28. The method of claim 1, wherein a size of the reference pattern image depends on a size of the data image.

29. The recording medium reproducing apparatus of claim 19, wherein the control unit is configured to determine the information associated to data-image distortion by comparing pre-recorded position information on the reference pattern image with a position of the reference pattern image read from the recording medium.

* * * * *